Sept. 12, 1944.    N. J. KAYSER    2,357,957
TOBOGGAN SEAL FOR SAND CLEANERS
Filed June 29, 1940

INVENTOR
NICOLAS J. KAYSER,
BY Ellis S. Middleton
ATTORNEY

Patented Sept. 12, 1944

2,357,957

UNITED STATES PATENT OFFICE 2,357,957

TOBOGGAN SEAL FOR SAND CLEANERS

Nicholas J. Kayser, Montreal, Quebec, Canada, assignor, by mesne assignments, to Charles E. Fraser, New York, N. Y.

Application June 29, 1940, Serial No. 343,257

10 Claims. (Cl. 210—128)

The present invention relates to a method of and mechanism for cleaning filter beds.

It is common practice in the treatment of sewage, industrial wastes, etc., to pass liquids containing the same through relatively shallow beds of sand, aggregate or the like, which removes the solids therefrom. Such beds, in the course of time, become clogged with the retained material, even though the raw material undergoing treatment has been subjected to preliminary treatment such as sedimentation or the like. As a consequence, it becomes necessary to restore the bed to somewhere near its initial solid removal capacity and this may be done by cleaning it either intermittently or continuously.

A popular type of cleaning mechanism for the above purpose consists of a travelling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydralic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals also prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

Seals used as above at the front and rear of the cleaner mechanism must be of a type which will make sealing contact with the bed surface even though the latter has a tendency to be uneven. The movement of liquid on top of a filter bed tends to cause hills and valleys and, consequently, a sealing mechanism is necessary which will accommodate itself to these differences in levels, while still maintaining a sufficiently tight contact to prevent seepage of liquid thereunder.

To this end, the invention contemplates a cleaner mechanism adapted to travel over a bed in which the seals either at the front, rear or both will include a flexibly mounted plate with a turned-up forward portion so that it will ride over a hill in the bed surface. This front portion of the plate is rigidly fastened to the cleaner so as to maintain its relationship with respect to the bed although this relationship may be adjusted from time to time. That portion of the plate adjacent the cleaner is attached to the latter in a flexible manner, such as by means of a sheet of rubber or the like. This permits this portion of the plate to move slightly in a vertical direction which has a tendency to smooth out any hills and valleys which the first part of the plate may have encountered.

By providing a similar assembly at each end of the cleaner, the rear device serves the purpose of smoothing out the sand of the bed after it has been cleaned. Duplicating these mechanisms makes possible the use of such a combination on rectangular beds for instance, where the cleaner operates back and forth, reversing its direction each time.

The invention further consists in the novel arrangement, combination and construction of parts more fully hereinafter described and shown in the accompanying drawing, in which—

Figure 1:
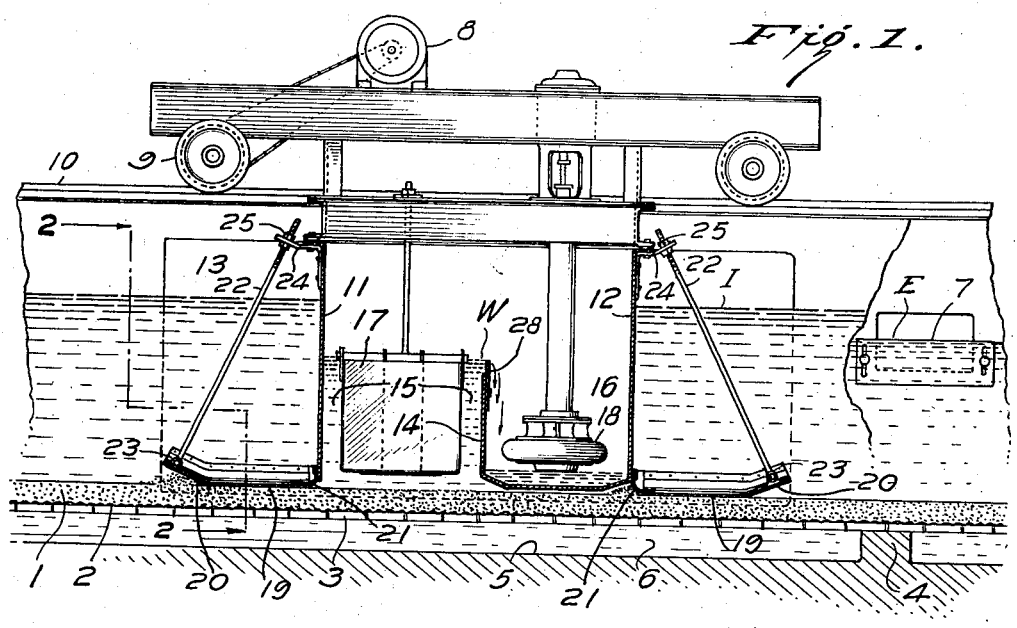
Fig. 1 is a side elevation partly in section of an apparatus embodying the present invention.
Figure 2:
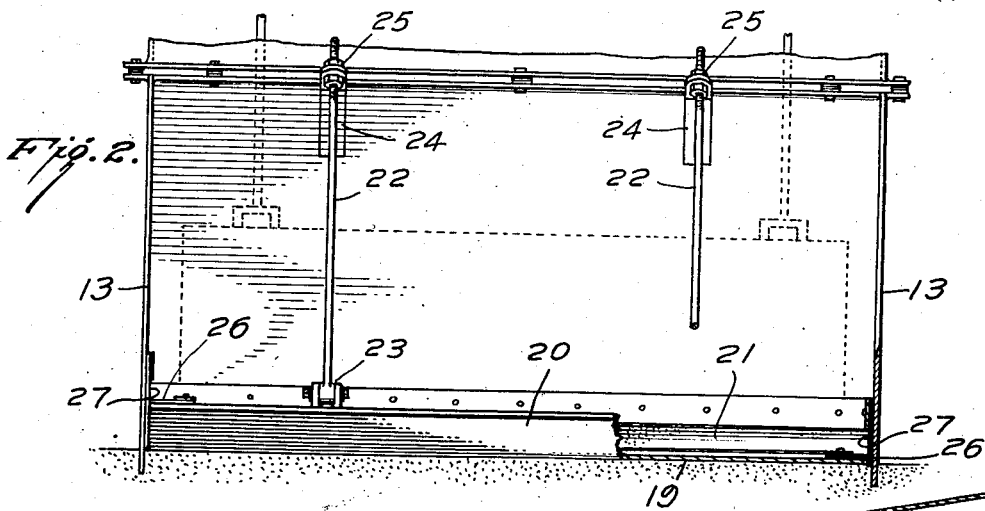
Fig. 2 is a view along the line 2—2 of Fig. 1.
Figure 3:
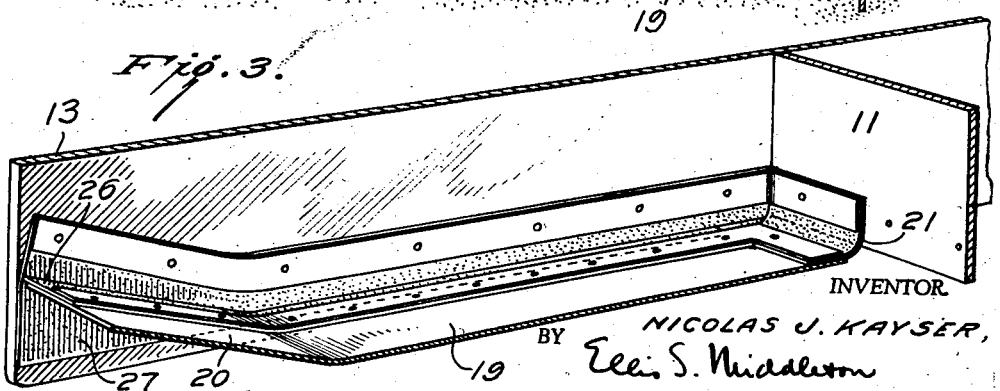
Fig. 3 is a fragmentary perspective detail showing the water tight connection between a sealing plate and the side walls of the cleaner.

Referring now to Fig. 1, the usual filter bed is shown at 1 of sand such as that of the magnetite or silica variety or any other aggregate or filter media. A suitable thickness of bed material rests upon a screen 2 supported by grid 3 resting upon the top of wall 4 so as to slightly space the grid from the bottom 5 of the filter tank. The space 6 serves as an effluent channel for clean filtered material in a downflow filter or as an inlet passage for influent to be filtered in an upflow filter.

As applied to a downflow filter system, although obviously not to be limited thereto, influent to be filtered either with or without preliminary treatment is flowed on top of the bed 1 until a suitable level I has been reached. This hydraulic head causes movement of the liquid to be filtered through the bed 1, the latter retaining the solids so that the clean effluent flows into the space 6 beneath the bed, passes upwardly through a vertical channel and spills over an adjustable weir 7 which establishes the effluent level E lower than the influent level I. Adjustment of the weir 7 may be made at will and by any suitable means to determine the relationship between these levels.

A suitable cleaning mechanism may consist of a trolley movable by motor 8 through wheels 9 mounted on a trackway 10. Depending from the trolley is a caisson consisting of front wall 11, rear wall 12 and side walls 13. A partition 14 divides the caisson into a bed washing channel 15 and a wash water compartment 16. In the former, a solenoid 17 or other agitation causing means is provided while in the latter a pump 18 is located for removing wash water therefrom.

The caisson makes a sealing contact with the filter bed for the purpose above described and this may be accomplished at the sides by extending the side walls 13 into the bed material a sufficient distance. At each end, a sealing plate 19 is provided having a forward angular portion 20 and joined to the front wall 11 of the caisson by means of a flexible hinge 21 of sheet rubber or the like. An adjusting rod 22 is pivoted as at 23 to the forward end of the sealing plate 19, the upper end of the rod being held by a bracket 24 and provided with an adjusting wheel 25. In this way, the relationship of the plate 19 and particularly the forward turned up edge portion 20 may be determined and fixed with relation to the bed, although this may be adjusted as found necessary. By providing a rubber strip 26 along the side edge of the plate 19 making a wiping contact with a similar rubber sheet 27 on the side walls 13 of the caisson influent or other liquid above the bed is prevented from leaking between the plate and the side walls and an effective seal is obtained at this point.

The same or different sealing means may be provided at the other end of the cleaning mechanism so long as it is effective. Inasmuch, however, as such cleaners are adaptable both to circular and rectangular filter beds, it is desirable to have the same type of sealing means at each end of the cleaner in order that the latter may move back and forth in two directions with equal effect and facility.

The solenoid 17 may be connected to a suitable intermittent source of electrical energy so as to energize the same. Upon establishing this connection, where the sand of the filter bed is of the magnetite variety, the latter is magnetized and an area thereof bodily lifted up toward the solenoid which loosens the dirt caught by the sand. It is to be noted that by suitable adjustment of the relative height of the solenoid or the degree of magnetic force created therein, any amount of bed may be lifted from a small quantity to one completely down to the wire. Assuming that a section of the bed down to the wire is lifted, this causes an area of agitation and weakened resistance in the bed and due to the fact that the wash water level W in the wash water compartment established by reason of adjustable weir 28 on intermediate wall 14 is lower than that of the effluent level E, clean effluent from below the bed flows up through this area of lessened resistance, washes the dirt loosened from the sand and carries it up through the agitation channel 15 over the top of weir 28 and into the wash water compartment 16 from which it is removed by the pump 18. When the solenoid 17 is deenergized, it releases the magnetite which drops back into the bed substantially clean. This cleaning operation is then repeated intermittently until the entire area of the bed has been subjected to the purging action.

As the cleaner moves over the bed in either direction, it is to be noted that if a hill is encountered, the forward tipped up end 20 of plate 19 rides thereover but due to the fact that the adjustment rod 22 is rigid, the top of the hill is taken off, pushed into the succeeding valley and the main body of the plate 19 rides thereover. Any unevenness then existing in the bed is smoothed out due to the fact that the rear end of the plate 19 is flexibly connected to the front wall 11 of the caisson. This permits a limited up and down movement although the weight of the sealing plate 19 is amply sufficient to smooth the bed at this point.

Similarly, after a bed area has been cleaned in the agitation zone, as the cleaner progresses thereover, the rear sealing plate has a tendency to smooth out any unevenness which may then exist in the bed surface. The flexibly hinged portion, then being the forward edge, may rise partially over a hill although the tendency will be to take the top off and push it into a valley. The trailing edge being rigidly connected with the cleaner mechanism, definitely forces a leveling off operation of any bed unevenness. As a consequence, regardless of which way the cleaner moves, a smooth surfaced bed is produced for the cleaning operation and is left behind after the cleaner passes thereover.

While the invention has been shown and described with particular reference to specific embodiments, it is to be understood that it is not to be limited thereto but is to be construed broadly and restricted solely by the scope of the appended claims.

I claim:

1. In combination, a traveling cleaner for a filter bed, means including a caisson engaging the upper surface of the bed and extending above the liquid level to seal off a section of the bed from a filtering action, wheels for mounting said cleaner to travel over the bed, means for washing the bed in said section and for removing dirt therefrom, said caisson including side and end portions and a rigid member mounted adjacent the bottom of one of said end portions and extending substantially the entire length thereof and means for hinging said rigid member to said end portion, the axis of said hinging means extending transversely of the direction of motion of the cleaner.

2. The combination of claim 1 in which the hinge between the rigid member and the cleaner is flexible.

3. The combination of claim 1 in which the edge of the rigid member opposite the hinge is adjustable toward and away from the bed surface.

4. The combination of claim 1 in which the edge of the rigid member opposite the hinge is adjustably fixed to the cleaner.

5. The combination of claim 1 in which the forward edge of the rigid member opposite the hinge is turned upwardly away from the bed, and an adjustment rod is adjustably fixed to the cleaner and hinged to the forward edge of the rigid member whereby the forward edge of the rigid member may be adjusted toward and away from the bed.

6. The combination of claim 1 in which the hinging means is of rubber.

7. In combination, a traveling cleaner adapted to travel over a filter bed including a caisson engaging the bed and extending above the level of the liquid having front and rear end portions and sides extending forwardly beyond the front end portion to seal off a section of the bed from a filtering action, means to agitate an area within said section, means for washing the bed in said area and removing dirt therefrom, said caisson also including a plate extending along the front end portion in sealing contact with the bed and with the side edges thereof extending between said forwardly extending sides, a rubber strip for hinging said plate to said end portion and a wiper between the side edges of the sealing plate and said forwardly extending sides.

8. In combination, a traveling cleaner adapted to travel over a filter bed having means including a caisson engaging the bed and extending above the level of the liquid to seal off a section of the bed from a filtering action, means for agitating a portion of the bed within said section, means for washing the portion of the bed in said section and for removing dirt therefrom, said caisson including a front end with sides extending forwardly beyond the front end, said sealing means including a rigid member, means for hinging said rigid member to the lower portion of the front end of said caisson, the axis of said hinging means being transverse to the movement of the cleaner, and means for forming a seal between the ends of said rigid member and the forwardly extending sides of the caisson.

9. The combination of claim 8, in which the hinging means is a flexible strip of material which permits limited upward movement of the rigid member.

10. The combination of claim 8, in which a member is secured to the forward part of said rigid member and to said cleaner and means is provided for adjusting the position of said member to raise and lower the forward part of said rigid member.

NICHOLAS J. KAYSER.